United States Patent
Wu et al.

(10) Patent No.: US 9,477,527 B2
(45) Date of Patent: Oct. 25, 2016

(54) RESOURCE OPTIMIZATION METHOD AND APPARATUS

(71) Applicant: TENCENT TECHNOLOGY (SHENZHEN) COMPANY LIMITED, Shenzhen (CN)

(72) Inventors: Tuanwang Wu, Shenzhen (CN); Sha Liu, Shenzhen (CN); Yang Liu, Shenzhen (CN); Xiao Yang, Shenzhen (CN); Hui Qi, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 0 days.

(21) Appl. No.: 14/733,097

(22) Filed: Jun. 8, 2015

(65) Prior Publication Data

US 2015/0309843 A1 Oct. 29, 2015

Related U.S. Application Data

(63) Continuation of application No. PCT/CN2013/085008, filed on Oct. 11, 2013.

(30) Foreign Application Priority Data

Dec. 7, 2012 (CN) .......................... 2012 1 0521593

(51) Int. Cl.
G06F 9/46 (2006.01)
G06F 9/50 (2006.01)
G06F 9/48 (2006.01)

(52) U.S. Cl.
CPC ............. *G06F 9/5038* (2013.01); *G06F 9/461* (2013.01); *G06F 9/4881* (2013.01); *G06F 9/5022* (2013.01)

(58) Field of Classification Search
CPC ...................................................... G06F 9/4881
USPC .................................................. 718/102, 103
See application file for complete search history.

(56) References Cited

U.S. PATENT DOCUMENTS

| 5,826,057 A | * | 10/1998 | Okamoto | G06F 12/109 703/24 |
| 6,859,792 B1 | * | 2/2005 | Marjadi | G06F 21/10 705/51 |
| 7,716,668 B2 | * | 5/2010 | Moore | G06F 9/4881 718/103 |
| 8,968,077 B2 | * | 3/2015 | Weber | 463/25 |
| 2005/0060702 A1 | * | 3/2005 | Bennett | G06F 9/45558 718/1 |

(Continued)

FOREIGN PATENT DOCUMENTS

| CN | 101464810 A | 6/2009 |
| CN | 101694631 A | 4/2010 |
| CN | 102521034 A | 6/2012 |

OTHER PUBLICATIONS

The World Intellectual Property Organization (WIPO) International Search Report for PCT/CN2013/085008 Jan. 16, 2014.

*Primary Examiner* — Phillip H Nguyen
(74) *Attorney, Agent, or Firm* — Anova Law Group, PLLC

(57) ABSTRACT

The present disclosure discloses a resource optimization method and apparatus. The method includes: detecting whether a currently started process is a process of a predetermined type; querying for suspendable processes among other currently running processes if it is detected that the currently started process is a process of the predetermined type; and suspending at least one process among the found suspendable processes.

16 Claims, 3 Drawing Sheets

(56) References Cited

U.S. PATENT DOCUMENTS

2007/0277172 A1* 11/2007 Kawakami ......... H04N 7/17318
　　　　　　　　　　　　　　　　　　　718/100
2008/0172668 A1* 7/2008 Tzruya .................... G06F 9/505
　　　　　　　　　　　　　　　　　　　718/101
2009/0300017 A1* 12/2009 Tokusho ........... G06F 17/30362
2013/0042246 A1* 2/2013 Berry .................... G06F 1/3206
　　　　　　　　　　　　　　　　　　　718/102

* cited by examiner

RESOURCE OPTIMIZATION METHOD AND APPARATUS

RELATED APPLICATION

This application is a continuation application of PCT patent application no. PCT/CN2013/085008, filed on Oct. 11, 2013, which claims priority to Chinese Patent Application No. 201210521593.7, filed with the Chinese Patent Office on Dec. 7, 2012 and entitled "RESOURCE OPTIMIZATION METHOD AND APPARATUS", the content of all of which is incorporated by reference in its entirety.

FIELD OF THE TECHNOLOGY

The present disclosure relates to the field of computing and, in particular, to a resource optimization method and apparatus.

BACKGROUND OF THE DISCLOSURE

With the continuous development of the field of computing, currently, some predetermined-type applications (such as a 3D game) have a high requirement on hardware resources. When the available hardware resources are insufficient, frame freezing often occurs. In order to ensure that some predetermined-type applications can run smoothly, hardware resources usually need to be optimized.

In an existing resource optimization method, a user needs to manually close some minor processes. For example, the user right-clicks a running application program in a toolbar of a desktop and selects to close the running application program, or the user opens a task manager of an operating system, and selects to close some processes in the task manager.

In the implementation of the present disclosure, the inventor finds that the existing technology at least has the following problems. In the existing resource optimization method, a user needs to manually close an application or a process, which involves a complex operation. Before a process of a terminal, such as a game process, is started, system resources are still abundant. However, after the game process, for example, is started, while a previous process still running, resources of the terminal become insufficient, and frame freezing occurs when the game process runs. Moreover, when the user manually closes the application program or the process, it is easy to close some system processes required for normal running of an operating system by mistake, so as to cause a system crash.

SUMMARY

In order to solve problems in the existing technology that a user operation is complex, a mis-operation may be easily performed, and user experience is poor, embodiments of the present invention provide a resource optimization method and apparatus. Technical solutions are as follows.

According to a first aspect, a resource optimization method is provided. The method includes detecting whether a currently started process is a process of a predetermined type; querying for suspendable processes among other currently running processes if it is detected that the currently started process is a process of the predetermined type; and suspending at least one process among the found suspendable processes.

According to another aspect, a resource optimization apparatus is provided. The apparatus includes a start detection module, configured to detect whether a currently started process is a process of a predetermined type; a process querying module, configured to query for suspendable processes among other currently running processes if the start detection module detects that the currently started process is a process of the predetermined type; and a process suspension module, configured to suspend at least one process among the suspendable processes found by the process querying module.

By using the disclosed methods and apparatus, when it is detected that a process of a predetermined type is started, other processes are suspended, so as to ensure resources required for running of the process of the predetermined type, which not only solves a problem in the existing technology that system resources are insufficient after some processes run, but also solves a problem in the existing technology that a user needs to manually close an application or a process and may cause a system crash when closing some system processes by mistake, thereby achieving an objective of improving smoothness of running the process of the predetermined type when resources are limited, and improving device performance.

BRIEF DESCRIPTION OF THE DRAWINGS

To describe the technical solutions according to the embodiments of the present invention more clearly, the accompanying drawings for describing the embodiments are introduced briefly in the following. Apparently, the accompanying drawings show only some embodiments of the present invention, and a person of ordinary skill in the art can derive other drawings from the accompanying drawings without creative efforts.

DESCRIPTION OF EMBODIMENTS

In order to make the objectives, technical solutions, and advantages of the present disclosure more comprehensible, the embodiments of the present disclosure are described in further detail below with reference to the accompanying drawings.

Figure 1:
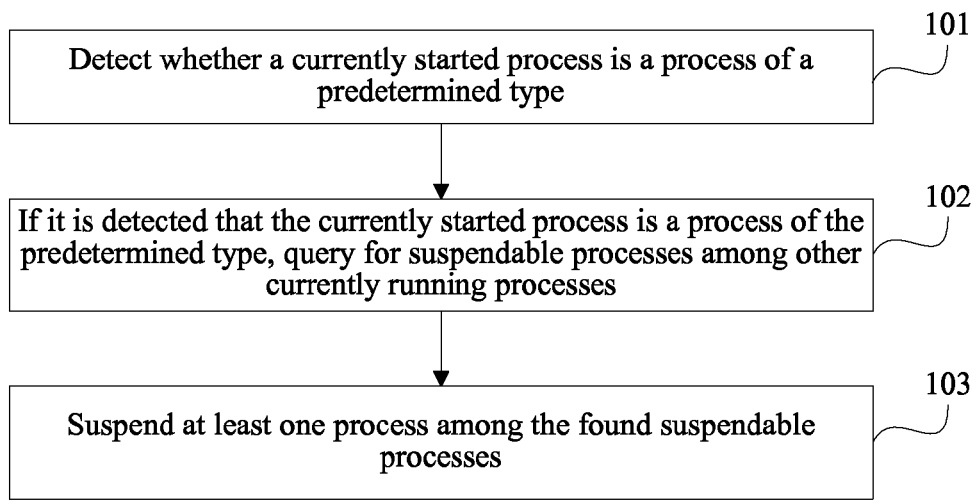
FIG. 1 illustrates a flowchart of a resource optimization method according to a first embodiment of the present invention.

Refer to FIG. 1, which shows a flowchart of a resource optimization method according to a first embodiment of the present invention. The resource optimization method may be used to optimize system resources when a process of a predetermined type runs. The resource optimization method may include the following steps.

Step 101: Detecting whether a currently started process is a process of a predetermined type.

Step 102: If it is detected that the currently started process is a process of the predetermined type, querying for suspendable processes among other currently running processes.

Step 103: Suspending at least one process among the found suspendable processes.

Thus, according to the resource optimization method provided in the first embodiment of the present invention, when it is detected that a process of a predetermined type is started, certain other processes are suspended, so as to ensure resources required for running of the process of the predetermined type, which not only solves a problem in the existing technology that system resources are insufficient after some processes run, but also solves a problem in the existing technology that a user needs to manually close an application or a process and may cause a system crash when closing some system processes by mistake, thereby achieving an objective of improving running smoothness of the process of the predetermined type when resources are limited and improving device performance.

Figure 2:
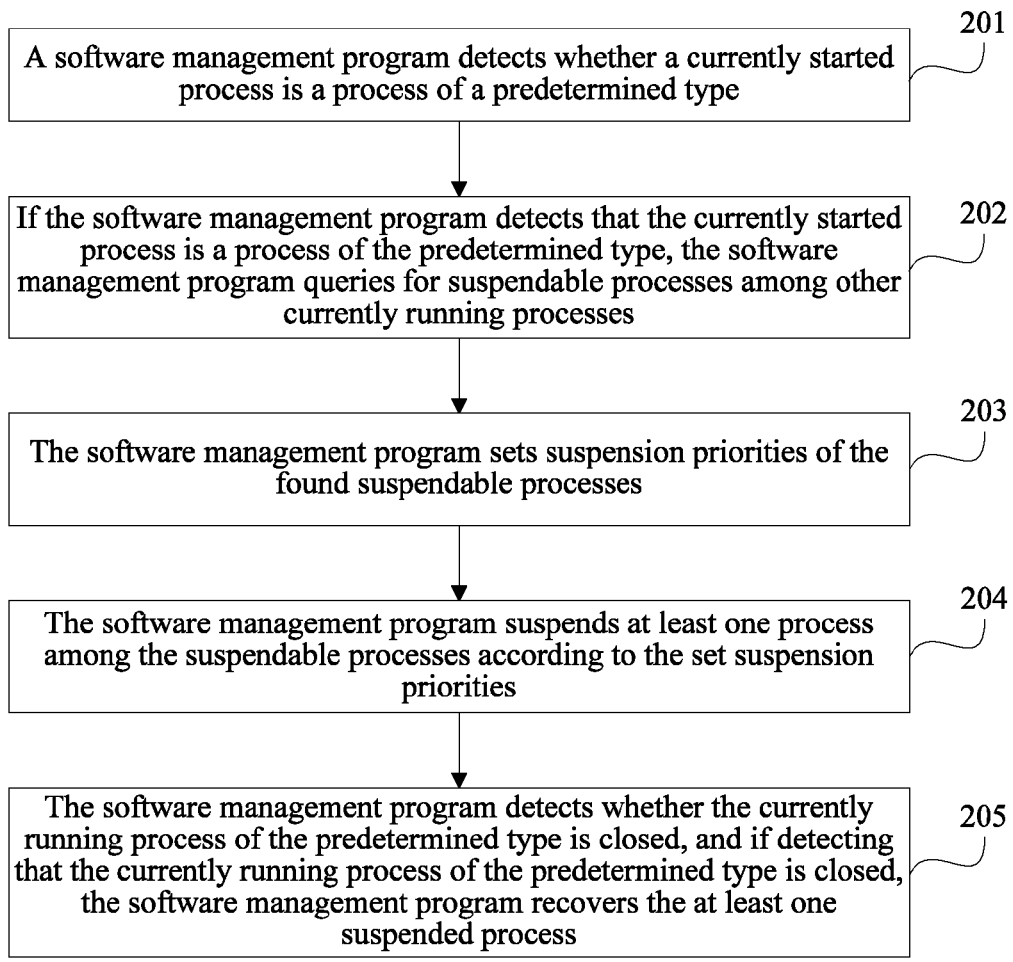
FIG. 2 illustrates a flowchart of a resource optimization method according to a second embodiment of the present invention.

The resource optimization method provided in the first embodiment is further described below, referring to FIG. 2. FIG. 2 shows a flowchart of a resource optimization method according to a second embodiment of the present invention. The resource optimization method may be used to optimize system resources when a process of a predetermined type runs. The process of the predetermined type may include, but is not limited to, an application process using a large volume of resources, such as a game process. As shown in FIG. 2, the resource optimization method may include the following steps.

Step 201: A software management program detects whether a currently started process is a process of a predetermined type.

The software management program detects whether the currently started process is a process of the predetermined type according to at least one of two methods, (1) determining whether a name of the currently started process exists in a preset predetermined-type process name list, and (2) determining whether an operating path of the currently started process exists in a preset predetermined-type process operating path list.

The preset predetermined-type process name list includes a locally stored predetermined-type process name list and a predetermined-type process name list stored in a network. When detecting whether the name of the currently started process exists in the preset predetermined-type process name list, it is first detected whether the name of the currently started process exists in the locally stored predetermined-type process name list; and if it is detected that the name of the currently started process exists in the locally stored predetermined-type process name list, it is determined that the currently started process is a process of the predetermined type.

If it is detected that the name of the currently started process does not exist in the locally stored predetermined-type process name list, it is further detected whether the name of the currently started process exists in the predetermined-type process name list stored in the network. If it is detected that the name of the currently started process exists in the predetermined-type process name list stored in the network, it is determined that the currently started process is a process of the predetermined type. Otherwise, it is determined that the currently started process is not a process of the predetermined type.

Correspondingly, methods for storing and detecting the predetermined-type process operating path list are similar to methods for storing and detecting the predetermined-type process name list.

Specifically, the software management program locally stores a name list of often-used predetermined-type processes and a detailed default installation path list of corresponding games. In addition, a network server also stores a name list of other predetermined-type processes and a detailed default installation path list of corresponding games. The server may further regularly update the predetermined-type process name list and the detailed default installation path list of the corresponding games, which are locally stored by the software management program, as well as the name list of the other predetermined-type processes and the detailed default installation path list of the corresponding games, which are stored by the network server.

When a process is started, the software management program first compares a process name of the currently started process with the locally stored predetermined-type process name list. If the name of the currently started process exists in the locally stored predetermined-type process name list, it is determined that the currently started process is a process of the predetermined type. Otherwise, the software management program further compares the process name of the currently started process with the predetermined-type process name list stored in the network.

If the name of the currently started process exists in the predetermined-type process name list stored in the network, it is determined that the currently started process is a process of the predetermined type. Otherwise, it is determined that the currently started process is not a process of the predetermined type. Alternatively, the software management program first compares a detailed process operating path of the currently started process with a locally stored detailed predetermined-type process operating path list. If the detailed operating path of the currently started process exists in the locally stored detailed predetermined-type process operating path list, it is determined that the currently started process is a process of the predetermined type.

Otherwise, the software management program further compares the detailed process operating path of the currently started process with a detailed predetermined-type process operating path list stored in the network. If the detailed operating path of the currently started process exists in the detailed predetermined-type process operating path list stored in the network, it is determined that the currently started process is a process of the predetermined type. Otherwise, it is determined that the currently started process is not a process of the predetermined type. Alternatively, the software management program may also combine the foregoing two methods, to detect whether the currently started process is a process of the predetermined type.

Further, after it is detected that the currently started process is a process of the predetermined type, it may be further determined whether the currently started process is a process displayed in full screen. If the currently started process is a process displayed in full screen, a step of querying for suspendable processes among other currently running processes in step 202 are performed. Otherwise, the procedure is ended.

In a practical application, the process of the predetermined type is generally displayed in full screen. However, in some cases, the process of the predetermined type may be displayed in non-full screen. When the process of the predetermined type is run and displayed in non-full screen, a user generally has a further requirement for using other user processes. In this case, a situation in which when the process of the predetermined type is run and displayed in non-full screen, other processes are unavailable because of suspension of other processes needs to be prevented. Therefore, after detecting that the currently started process is a process of the predetermined type, the software management program may further determine whether the process of the predetermined type is a process displayed in full screen. If the process of the predetermined type is a process displayed in full screen, it can be determined that other unrelated user processes need to be suspended, and step 202 may be performed. Otherwise, it can be determined that other unrelated user processes cannot be suspended, and the procedure is ended.

It should be understood by a person skilled in the art that, the determining of a process displayed in full screen may be performed or not performed according to actual demands.

Step 202: If the software management program detects that the currently started process is a process of the predetermined type, the software management program queries for suspendable processes among other currently running processes.

The software management program may query for user processes unrelated to the currently started process among the other currently running processes, and determines that the found user processes are suspendable processes.

Specifically, by using a Windows operating system as an example, the software management program queries a resource manager for process names. Processes in the Windows operating system may be classified into two types: one type is a system process required for normal running of the system, and when this type of process is closed or suspended, a system crash may be caused; the other type is a user process that can be closed or started at any time, and when this type of process is closed, normal running of other processes in the system is not affected. After detecting that the currently started process is a process of the predetermined type, the software management program may query for user processes unrelated to the currently started process among currently running user processes according to the process names in the resource manager, and determines that the found user processes are suspendable processes. It should be noted that a user process related to the currently started process is not considered as a suspendable process.

Step 203: The software management program sets suspension priorities of the found suspendable processes.

The software management program acquires the volumes of resources used by the found suspendable processes, and sets suspension priorities of the suspendable processes in a descending order according to a descending order of the acquired volumes of resources used by the suspendable processes. The volume of used resources may include the volume of used processor resources and the volume of occupied physical memory space. Other resources may also be included.

Specifically, the software management program first acquires the volumes of resources used by the user processes, and arranges priorities of the user processes according to the volumes of used resources. A user process using a larger volume of system resources has a higher suspension priority. That is, the software management program selects to preferentially suspend a user process using a larger volume of resources.

Step 204: The software management program suspends at least one process among the suspendable processes according to the set suspension priorities.

The software management program suspends at least one suspendable process of a higher suspension priority according to the descending order of the set suspension priorities of the suspendable processes. For example, a suspendable process with a highest suspension priority may be suspended, or suspendable processes within certain range of suspension priority may be suspended. Optionally, suspendable processes within certain range of suspension priority may be randomly selected to be suspended.

Further, the software management program may further acquire a current resource usage ratio of a system, and determine whether the acquired resource usage ratio exceeds a preset threshold. If it is determined that the acquired resource usage ratio exceeds the preset threshold, the software management program suspends one or more remaining suspendable processes, similar to above suspension mechanisms.

In a practical application, the software management program first suspends, according to the descending order of the suspension priorities of the suspendable processes, one or more processes of a higher suspension priority. That is, one or more processes that use a larger volume of resources, and then may further selectively suspend other suspendable processes according to a resource usage ratio of a system when the process of the predetermined type runs.

Specifically, for example, software management software presets a threshold of a resource usage ratio to 80% and, when the process of the predetermined type runs, the software management software may acquire a current resource usage ratio of a system, and determine whether the acquired resource usage ratio exceeds 80%. If yes, it indicates that system resources are not sufficient enough to ensure smooth running of the game process. In this case, other suspendable processes that are not suspended yet need to be suspended.

Further, the software management program may display a suspension permission setting interface to a user, and set suspension permission of each user process to be allowed or denied according to an operating instruction of the user through the suspension permission setting interface.

When querying for suspendable processes among the currently running processes, the software management program determines that a user process whose suspension permission is set to be allowed among the user processes unrelated to the currently started process is a suspendable process. Alternatively, when suspending a suspendable process, the software management program suspends a suspendable process whose suspension permission is set to be allowed.

Specifically, the software management program may display often-used user processes to the user by a program interface, and the user may select to set at least one user process among the often-used user processes not to be allowed to be suspended, and set other user processes by default to be allowed to be suspended.

When suspending the suspendable processes, the software management program may send an instruction for suspending at least one process among the suspendable processes to an operating system, so that the operating system temporarily stops the at least one process and releases resources used by the at least one temporarily stopped process.

Specifically, the Windows system includes an application layer and a driver layer, where the driver layer controls a program of the system, and the application layer controls a program of a user application. After setting the suspension priorities of the found suspendable processes, the software management program sends an instruction for suspending at least one user process from the application layer of the operating system, so that the operating system temporarily stops the at least one user process, and transfers the at least one user process out of a hardware memory, so as to ensure resources required for running of the process of the predetermined type and to implement resource optimization.

Figure 3:
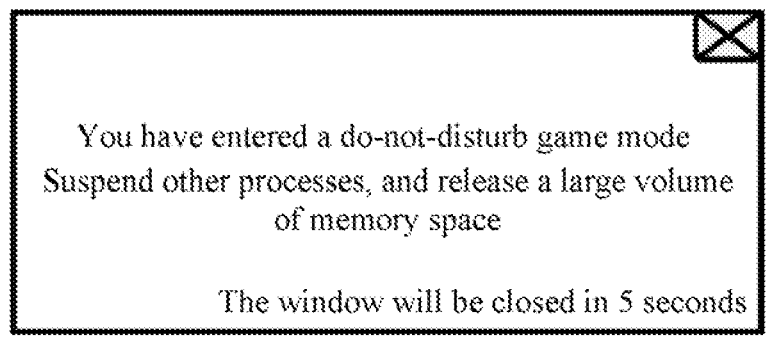
FIG. 3 illustrates a schematic diagram of a prompt window according to a second embodiment of the present invention.

Assuming that the process of the predetermined type is a game process, after a user enters the game and resources are optimized, the software management program displays a state prompt on a screen, so as to inform the user that the system resources are already optimized. For example, FIG. 3 shows a schematic diagram of a prompt window. As shown in FIG. 3, a prompt window is used to inform the user that the other processes are suspended. The user may also be prompted that the prompt window will be closed in, e.g., 5 seconds.

Step 205: The software management program detects whether the currently running process of the predetermined type is closed. If detecting that the currently running process of the predetermined type is closed, the software management program recovers the at least one suspended process.

In this method provided in this embodiment, a software management program suspends an unrelated running process in a system when a process of a predetermined type runs, thereby achieving an objective of resource optimization. In addition, in order to ensure consistency between system running conditions before and after resource optimization and prevent a case in which a suspended process still cannot run after the process of the predetermined type is closed. Further, the software management program detects whether the currently running process of the predetermined type is closed. If it is detected that the currently running process of the predetermined type is closed, the software management program sends an instruction to an operating system for recovering the at least one suspended process, so that the operating system recovers the at least one suspended process.

Specifically, when sending the instruction for suspending at least one user process to the Windows application layer, the software management program further stores a list including the at least one user process. When it is detected that the process of the predetermined type is closed, the software management program sends a command for starting the at least one user process to the Windows system according to the stored list in a manner of invoking an application programming interface (API) of the Windows system, so that the Windows system recovers at least one suspended process.

Thus, according to the resource optimization method provided in this embodiment of the present invention, when it is detected that a process of a predetermined type is started, other processes are suspended, so as to ensure resources required for running of the process of the predetermined type. This method not only solves a problem in the existing technology that system resources are insufficient after some processes run, but also solves a problem in the existing technology that a user needs to manually close an application or a process and may cause a system crash when closing some system processes by mistake, thereby achieving an objective of improving running smoothness of the process of the predetermined type when resources are limited and improving device performance.

In addition, when it is detected that the process of the predetermined type is closed, the suspended processes are recovered, which solves a problem that system running conditions before and after resource optimization are inconsistent, and achieves an objective that, after the process of the predetermined type is closed, the suspended processes may continue to run. Moreover, when it is detected that the currently running process of the predetermined type is displayed in non-full screen, other processes are not suspended, which solves a problem that when the process of the predetermined type is run and displayed in non-full screen, other processes are unavailable, and achieves an objective that, when the process of the predetermined type is run and displayed in non-full screen, other processes can also run.

Figure 4:
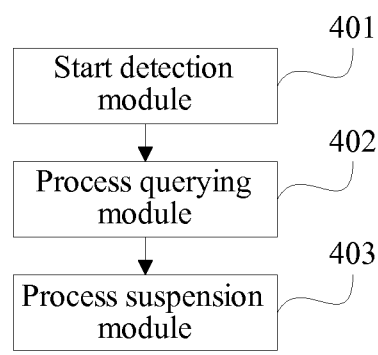
FIG. 4 illustrates a structural diagram of a resource optimization apparatus according to a first embodiment of the present invention.

Corresponding to the resource optimization method provided in the first embodiment, referring to FIG. 4, which shows a structural diagram of a resource optimization apparatus according to a first embodiment of the present invention, the resource optimization apparatus may be applied to a software management program. The resource optimization apparatus may include a start detection module 401, a process querying module 402, and a process suspension module 403. Other modules may also be included.

The start detection module 401 is configured to detect whether a currently started process is a process of a predetermined type; the process querying module 402 is configured to query for suspendable processes among other currently running processes if the start detection module 401 detects that the currently started process is a process of the predetermined type; and the process suspension module 403 is configured to suspend at least one process among the suspendable processes found by the process querying module.

Further, the start detection module 401 is configured to detect whether the currently started process is a process of the predetermined type according to one or two of two methods, determining whether a name of the currently started process exists in a preset predetermined-type process name list; and determining whether an operating path of the currently started process exists in a preset predetermined-type process operating path list.

The preset predetermined-type process name list includes a locally stored predetermined-type process name list and a predetermined-type process name list stored in a network, and the preset detailed predetermined-type process operating path list includes a locally stored detailed predetermined-type process operating path list and a detailed predetermined-type process operating path list stored in the network.

Figure 5:
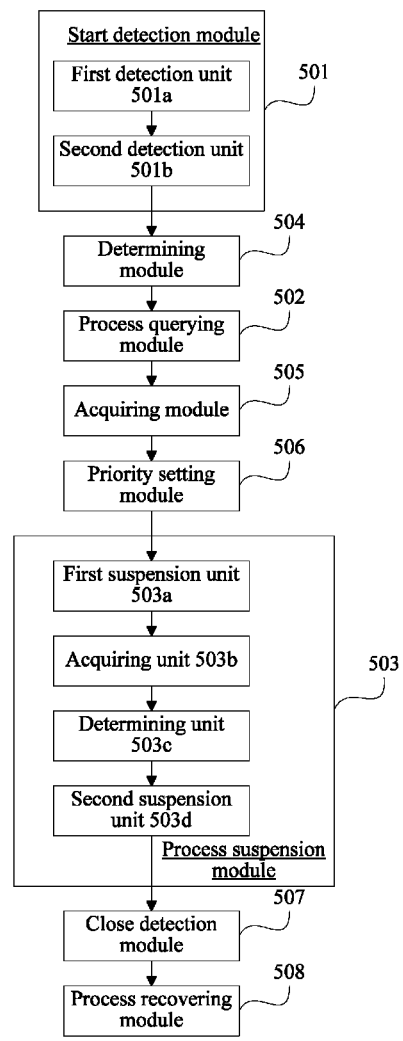
FIG. 5 illustrates a structural diagram of a resource optimization apparatus according to a second embodiment of the present invention.

Referring to FIG. 5, FIG. 5 is a structural diagram of a resource optimization apparatus according to a second embodiment of the present invention. As shown in FIG. 5, the resource optimization apparatus includes a start detection module 501, a determining module 504, a process querying module 502, an acquiring module 505, a priority setting module 506, a process suspension module 503, a close detection module 507, and a process recovering module 508. Certain modules may be omitted and other modules may be added.

The start detection module 501 includes a first detection unit 501a, and a second detection unit 501b. The first detection unit 501a is configured to detect whether the name of a currently started process exists in the locally stored predetermined-type process name list and, if the name of the currently started process exists in the locally stored predetermined-type process name list, to determine that the currently started process is a process of the predetermined type.

The second detection unit 501b is configured to further detect whether the name of the currently started process exists in the predetermined-type process name list stored in the network if the first detection unit 501a detects that the name of the currently started process does not exist in the locally stored predetermined-type process name list, and to determine that the currently started process is a process of the predetermined type if the name of the currently started process exists in the predetermined-type process name list stored in the network; or to determine that the currently started process is not a process of the predetermined type if the name of the currently started process does not exist in the predetermined-type process name list stored in the network either.

Alternatively, the first detection unit 501a is configured to detect whether the detailed operating path of the currently started process exists in the locally stored detailed predetermined-type process operating path list and, if the detailed operating path of the currently started process exists in the locally stored detailed predetermined-type process operating path list, to determine that the currently started process is a process of the predetermined type.

The second detection unit 501b is configured to further detect whether the detailed operating path of the currently started process exists in the detailed predetermined-type process operating path list stored in the network if the first detection unit 501a detects that the detailed operating path of the currently started process does not exist in the locally stored detailed predetermined-type process operating path list, and to determine that the currently started process is a process of the predetermined type if the detailed operating path of the currently started process exists in the detailed predetermined-type process operating path list stored in the network; or to determine that the currently started process is not a process of the predetermined type if the detailed operating path of the currently started process does not exist in the detailed predetermined-type process operating path list stored in the network either.

Alternatively, the first detection unit 501a and the second detection unit 501b may also combine the foregoing two methods, to detect whether the currently started process is a process of the predetermined type.

Further, the determining module 504 is configured to, after it is detected that the currently started process is a process of the predetermined type, determine whether the currently started process is a process displayed in full screen. If the determining module 504 determines that the currently started process is a process displayed in full screen, the process querying module 502 queries for the suspendable processes among the other currently running processes.

The process querying module 502 is configured to query for user processes unrelated to the currently started process among the other currently running processes, and determine that the found user processes are suspendable processes. The other currently running processes include a system process and a user process.

Further, the acquiring module 505 is configured to acquire the volumes of resources used by the suspendable processes determined by the process querying module 502.

The priority setting module 506 is configured to set suspension priorities of the suspendable processes in a descending order according to a descending order of the volumes, which are acquired by the acquiring module 505, of resources used by the suspendable processes.

Further, the process suspension module 503 includes a first suspension unit 503a, an acquiring unit 503b, a determining unit 503c, and a second suspension unit 503d. The first suspension unit 503a is configured to suspend at least one suspendable process of a higher suspension priority according to the descending order of the suspension priorities, which are set by the priority setting module 506, of the suspendable processes.

The acquiring unit 503b is configured to acquire a current resource usage ratio of a system. The determining unit 503c is configured to determine whether the acquired current resource usage ratio exceeds a preset threshold; and the second suspension unit 503d is configured to suspend a remaining suspendable process if the determining unit 503c determines that the acquired current resource usage ratio exceeds the preset threshold.

Further, the close detection module 507 is configured to detect whether the currently running process of the predetermined type is closed; and the process recovering module 508 is configured to send an instruction for recovering the at least one suspended process to an operating system if the close detection module 507 detects that the currently running process of the predetermined type is closed, so that the operating system recovers the at least one suspended process.

It should be noted that, the process of the predetermined type mentioned in the first and second embodiments of the present invention may include, but is not limited to, an application process using a large volume of resources, such as a game process.

Thus, according to the resource optimization apparatus provided in the first and second embodiments of the present invention, when it is detected that a process of a predetermined type is started, other processes are suspended, and when it is detected that the process of the predetermined type is closed, the suspended processes are recovered, so as to ensure resources required for running of the process of the predetermined type. This resource optimization apparatus not only solves a problem in the existing technology that system resources are insufficient after some processes run, but also solves a problem in the existing technology that a user needs to manually close an application or a process and may cause a system crash when closing some system processes by mistake, thereby achieving an objective of improving running smoothness of the process of the predetermined type when resources are limited and improving device performance.

In addition, when it is detected that the process of the predetermined type is closed, the suspended processes are recovered, which solves a problem that system running conditions before and after resource optimization are inconsistent, and achieves an objective that after the process of the predetermined type is closed, the suspended processes may continue to run. Moreover, when it is detected that the currently running process of the predetermined type is displayed in non-full screen, other processes are not suspended, which solves a problem that when the process of the predetermined type is run and displayed in non-full screen, other processes are unavailable, and achieves an objective that when the process of the predetermined type is run and displayed in non-full screen, other processes can also run.

It should be noted that, when the resource optimization apparatus provided in the foregoing embodiments performs resource optimization, the division of the functional modules is merely used as an example for description. In a practical application, the foregoing functions may be allocated to different functional modules as required. That is, an internal structure of the apparatus is divided into different functional modules, so as to accomplish all or some functions described above. In addition, the resource optimization apparatus provided in the foregoing embodiments belongs to the same concept as the embodiments of the resource optimization method. For a specific implementation process, refer to the method embodiment for details, which is not described herein again.

A person of ordinary skill in the art may understand that all or some of the steps of the foregoing embodiments may be implemented by using hardware, or may be implemented by a program instructing relevant hardware. The program may be stored in a computer-readable storage medium. The storage medium may be a read-only memory, a magnetic disk, an optical disc, or the like.

The foregoing descriptions are merely preferred embodiments of the present invention, but are not intended to limit the present disclosure. Any modification, equivalent replacement, or improvement made within the spirit and principle of the present disclosure shall fall within the protection scope of the present disclosure.

What is claimed is:

1. A resource optimization method, the method comprising:
   detecting whether a currently started process is a process of a predetermined type exists in a preset predetermined-type process name list, wherein the preset predetermined-type process name list comprises a locally stored predetermined-type process list and a predetermined-type process list stored in a network, and the determining whether a name of the currently started process exists in a preset predetermined-type process name list comprises:
      detecting whether the name of the currently started process exists in the locally stored predetermined-type process name list; and
      when it is detected that the name of the currently started process does not exist in the locally stored predetermined-type process name list, detecting whether the name of the currently started;
   querying for suspendable processes among other currently running processes if it is detected that the currently started process is a process of the predetermined type; and
   suspending at least one process among the found suspendable processes.

2. The resource optimization method according to claim 1, wherein the detecting whether a currently started process is a process of a predetermined type comprises:
   detecting whether the currently started process is a process of the predetermined type according to at least one of determining whether a name of the currently started process exists in a preset predetermined-type process name list, and determining whether an operating path of the currently started process exists in a preset predetermined-type process operating path list.

3. The resource optimization method according to claim 2, before the querying for suspendable processes among other currently running processes, further comprising:
   after it is detected that the currently started process is a process of the predetermined type, determining whether the currently started process is a process displayed in full screen; and
   when it is determined that the currently started process is a process displayed in full screen, performing the step of querying for suspendable processes among other currently running processes.

4. The resource optimization method according to claim 3, the querying for suspendable processes among other currently running processes comprises:
   querying for user processes unrelated to the currently started process among the other currently running processes; and
   determining that the found user processes are suspendable processes.

5. The resource optimization method according to claim 4, after the determining that the found user processes are suspendable processes, further comprising:
   acquiring volumes of resources used by the found suspendable processes; and
   setting suspension priorities of the suspendable processes in a descending order according to a descending order of the acquired volumes of resources used by the suspendable processes.

6. The resource optimization method according to claim 5, further comprising:
   suspending at least one suspendable process of a higher suspension priority according to the descending order of the set suspension priorities of the suspendable processes.

7. The resource optimization method according to claim 6, after the suspending at least one suspendable process of a higher suspension priority, further comprising:
   acquiring a current resource usage ratio of a system, and determining whether the acquired current resource usage ratio exceeds a preset threshold; and
   when it is determined that the acquired current resource usage ratio exceeds the preset threshold, suspending a remaining suspendable process.

8. The resource optimization method according to claim 7, wherein the method further comprises:
   determining whether the currently running process of the predetermined type is closed; and
   when it is detected that the currently running process of the predetermined type is closed, sending an instruction for recovering the at least one suspended process to an operating system, so that the operating system recovers the at least one suspended process.

9. A resource optimization apparatus, the apparatus comprising a processor configured to execute:
   a start detection module configured to detect whether a currently started process is a process of a predetermined type exists in a preset predetermined-type process name list, wherein the preset predetermined-type process name list comprises a locally stored predetermined-type process list and a predetermined-type process list stored in a network, and the start detection module comprises:
      a first detection unit configured to detect whether the name of the currently started process exists in the locally stored predetermined-type process name list; and
      a second detection unit configured to further detect whether the name of the currently started process exists in the predetermined-type process name list stored in the network if the first detection unit detects that the name of the currently started process does not exist in the locally stored predetermined-type process name list;
   a process querying module configured to query for suspendable processes among other currently running processes if the start detection module detects that the currently started process is a process of the predetermined type; and
   a process suspension module configured to suspend at least one process among the suspendable processes found by the process querying module.

10. The resource optimization apparatus according to claim 9, wherein
    the start detection module is configured to detect whether the currently started process is a process of the predetermined type according to at least one of determining whether a name of the currently started process exists in a preset predetermined-type process name list, and determining whether an operating path of the currently started process exists in a preset predetermined-type process operating path list.

11. The resource optimization apparatus according to claim 10, wherein the apparatus further comprises:
a determining module configured to: after it is detected that the currently started process is a process of the predetermined type, determine whether the currently started process is a process displayed in full screen,
wherein, if the determining module determines that the currently started process is a process displayed in full screen, the process querying module performs the step of querying for suspendable processes among other currently running processes.

12. The resource optimization apparatus according to claim 11, wherein
the process querying module is configured to query for user processes unrelated to the currently started process among the other currently running processes, and determine that the found user processes are suspendable processes.

13. The resource optimization apparatus according to claim 12, wherein the apparatus further comprises:
an acquiring module configured to acquire volumes of resources used by the suspendable processes determined by the process querying module; and
a priority setting module configured to set suspension priorities of the suspendable processes in a descending order according to a descending order of the acquired volumes of resources used by the suspendable processes.

14. The resource optimization apparatus according to claim 13, wherein the process suspension module comprises:

a first suspension unit configured to suspend at least one suspendable process of a higher suspension priority according to the descending order of the suspension priorities, which are set by the priority setting module, of the suspendable processes.

15. The resource optimization apparatus according to claim 14, wherein the process suspension module further comprises:
an acquiring unit configured to acquire a current resource usage ratio of a system;
a determining unit configured to determine whether the acquired current resource usage ratio exceeds a preset threshold; and
a second suspension unit configured to suspend a remaining suspendable process if the determining unit determines that the acquired current resource usage ratio exceeds the preset threshold.

16. The resource optimization apparatus according to claim 15, wherein the apparatus further comprises:
a close detection module configured to detect whether the currently running process of the predetermined type is closed; and
a process recovering module configured to send an instruction for recovering the at least one suspended process to an operating system if the close detection module detects that the currently running process of the predetermined type is closed, so that the operating system recovers the at least one suspended process.

* * * * *